United States Patent
Ender (10) Patent No.: US 9,180,629 B2
(45) Date of Patent: Nov. 10, 2015

(54) METHOD FOR PRODUCING AN INTEGRAL FIBER COMPOSITE PART

(75) Inventor: Tobias Ender, Bremen (DE)

(73) Assignee: AIRBUS Operations GmbH, Hamburg (DE)

( * ) Notice: Subject to any disclaimer, the term of this patent is extended or adjusted under 35 U.S.C. 154(b) by 733 days.

(21) Appl. No.: 12/922,151

(22) PCT Filed: Feb. 12, 2009

(86) PCT No.: PCT/EP2009/051603
§ 371 (c)(1),
(2), (4) Date: Feb. 7, 2011

(87) PCT Pub. No.: WO2009/112321
PCT Pub. Date: Sep. 17, 2009

(65) Prior Publication Data
US 2011/0168324 A1      Jul. 14, 2011

Related U.S. Application Data

(60) Provisional application No. 61/035,975, filed on Mar. 12, 2008.

(30) Foreign Application Priority Data

Mar. 12, 2008   (DE) .......................... 10 2008 013 759

(51) Int. Cl.
*B29C 41/00*     (2006.01)
*B29C 70/48*     (2006.01)
(Continued)

(52) U.S. Cl.
CPC .............. *B29C 70/48* (2013.01); *B29C 33/301* (2013.01); *B29C 33/38* (2013.01); *B29C 33/52* (2013.01);
(Continued)

(58) Field of Classification Search
CPC ...... B29C 33/301; B29C 33/38; B29C 33/52; B29C 70/48; B29C 70/543
USPC .......................................................... 156/243
See application file for complete search history.

(56) References Cited

U.S. PATENT DOCUMENTS 4,548,773 A * 10/1985 Suh et al. ...................... 264/40.6
4,704,918 A * 11/1987 Orkin et al. .................. 74/579 R
(Continued)

FOREIGN PATENT DOCUMENTS

DE     296 17 904 U1     1/1997
DE     29617904 U1 *     1/1997
(Continued)

OTHER PUBLICATIONS

PCT International Search Report, PCT/EP2009/051603, Jul. 20, 2009, 5 Pages.
(Continued)

*Primary Examiner* — Philip Tucker
*Assistant Examiner* — Vicki Wu
(74) *Attorney, Agent, or Firm* — Fenwick & West LLP (57) ABSTRACT

The method according to the invention allows the production of a complex, integral (onepiece) fiber composite part having a plurality of internal and undercut stiffening elements employing removable cores. Because connection elements are no longer necessary, a high weight savings potential results, because, for example, rivets and rivet flanges required for this purpose, as in the case of conventional assembly from individual parts (differential construction), become superfluous.

16 Claims, 6 Drawing Sheets

(51) Int. Cl.
  *B29C 33/30* (2006.01)
  *B29C 33/38* (2006.01)
  *B29C 33/52* (2006.01)
  *B29C 70/54* (2006.01)
  *B29L 31/30* (2006.01)

(52) U.S. Cl.
  CPC ............ *B29C 70/543* (2013.01); *B29C 70/545* (2013.01); *B29L 2031/3076* (2013.01); *Y02T 50/433* (2013.01)

(56) References Cited

U.S. PATENT DOCUMENTS

| | | | |
|---|---|---|---|
| 5,137,071 A | | 8/1992 | Ashton et al. |
| 6,116,539 A | * | 9/2000 | Williams et al. ............... 244/46 |
| 6,264,868 B1 | * | 7/2001 | Marchant ...................... 264/221 |
| 2002/0090874 A1 | | 7/2002 | McKague, Jr. et al. |
| 2003/0116262 A1 | * | 6/2003 | Stiesdal et al. ................ 156/245 |
| 2004/0170554 A1 | * | 9/2004 | Wadahara et al. .......... 423/447.2 |
| 2006/0017197 A1 | * | 1/2006 | Christensen et al. ......... 264/313 |
| 2006/0062973 A1 | * | 3/2006 | Wilson ........................... 428/188 |
| 2007/0057123 A1 | | 3/2007 | Gahete et al. |
| 2007/0081900 A1 | * | 4/2007 | Nies ............................... 416/224 |
| 2007/0207323 A1 | * | 9/2007 | Maxwell et al. ............... 428/414 |
| 2009/0142130 A1 | * | 6/2009 | Frisch et al. ................... 403/267 |

FOREIGN PATENT DOCUMENTS

| | | | |
|---|---|---|---|
| DE | 103 26 422 A1 | | 1/2005 |
| DE | 103 42 867 A1 | | 4/2005 |
| DE | 10 2004 009 744 A1 | | 9/2005 |
| DE | 102004009744 A1 | * | 9/2005 |
| EP | 1 074 466 A1 | | 2/2001 |
| EP | 1074466 A1 | * | 2/2001 |
| EP | 1 310 351 A1 | | 5/2003 |
| EP | 1 764 307 A1 | | 3/2007 |
| EP | 1 772 621 A2 | | 4/2007 |
| FR | 2 018 129 A1 | | 5/1970 |
| GB | 845093 A | | 8/1960 |
| JP | 36-022774 | | 5/1957 |
| JP | 60174632 A | * | 9/1985 |
| JP | 61-008122 | | 1/1986 |
| JP | 11-077701 A | | 3/1999 |
| JP | 03-065317 A | | 3/2003 |
| JP | 04-265714 A | | 9/2004 |
| JP | 2006-512240 A | | 4/2006 |
| RU | 2080750 C1 | | 5/1997 |
| RU | 2177410 C2 | | 12/2001 |
| RU | 2188126 C2 | | 8/2002 |
| WO | WO 03/103933 A1 | | 12/2003 |
| WO | WO 04/000643 A2 | | 12/2003 |

OTHER PUBLICATIONS

Japanese Office Action, Japanese Application No. 2010-550109, Jun. 25, 2013, 6 pages.

Russian Decision to Grant, Russian Application No. 2010134802/05 (049444), 6 pages.

* cited by examiner

METHOD FOR PRODUCING AN INTEGRAL FIBER COMPOSITE PART

CROSS-REFERENCE TO RELATED APPLICATIONS

This application claims the benefit of U.S. Provisional Application No. 61/035,975, filed Mar. 12, 2008 and German Patent Application No. 10 2008 013 759.6, filed Mar. 12, 2008, the entire disclosures of which are herein incorporated by reference.

FIELD OF THE INVENTION

The invention relates to a method for producing an integral fibre composite component, in particular an aerodynamic surface, comprising a plurality of stiffening members surrounded by an outer skin.

The invention also concerns a core mould for simultaneous and flexible production of the cores required in the method.

In modern aircraft construction, traditional aluminium materials are increasingly being superseded by the use of fibre composite components which are, for example, made from carbon fibre-reinforced thermosetting or thermoplastic polymers. Nowadays, even complex structural components such as landing flaps or entire rudder units are often generally made from such fibre composite materials, especially CFRP materials such as carbon fibre-reinforced epoxy resins.

Due to their physical dimensions and/or their complex geometric form, structural components of this kind are usually produced using so-called differential construction, in which the structural components are assembled in a final assembly stage from a plurality of prefabricated individual components with a geometry which is usually simpler.

By way of example, a landing flap for an aircraft may be cited in this context, in which landing flap a plurality of transverse ribs are attached to a plurality of longitudinal spars, which are spaced apart from but run parallel to each other, to support the skin shell. The external contours of the transverse ribs and the shape of the skin shell are ultimately defined by the surface geometry of the skin shells, thus defining the aerodynamic behaviour of the landing flap. All components must also be able to be assembled without stress in order to avoid applying additional loads to the structure.

The disadvantage of differential construction is, amongst other things, down to the fact that the individual parts need to be assembled to form the finished component in an additional assembly stage. In addition, overlaps or flanges are generally required in the process of joining the components together and these always entail additional weight.

Other disadvantages arise due to the preferred use of riveted joints to connect the individual parts. As fibre composite components have considerably lower bearing strengths than metal materials, each rivet hole applied constitutes a static disadvantage which must be compensated by increased material thicknesses in the region of the hole. In order to use such riveted joints on fibre composite components at all, increased material thicknesses and larger flange areas also need to be provided on shell structures, for example, so that, in the event of the riveted joint failing, it is indeed possible to carry out repairs by creating another riveted joint. All these constraints mean that the composite component is not designed with a view to a maximum expected mechanical load, but with respect to marginal production conditions or safety-related repair requirements, which tends to increase the weight unnecessarily.

As a general rule, the individual components can also be joined together by adhesive bonding, thus at least eliminating the problem of reduced bearing strength. However, there are still major problems with so-called "structural bonding" on highly stressed components in aircraft with regard to the necessary surface treatment, fatigue safety and ability to withstand impact loads (so-called impact resistance), which problems currently mean that this solution still cannot be used for safety reasons, at least in the civil aviation sector.

A practicable alternative to differential construction is integral construction, whereby fibre composite components with a complex geometry are produced as single components such that the above-mentioned disadvantages due to joining a plurality of individual components to form a complex overall structure no longer apply.

A major problem when producing such integral components, which may include complete landing flaps, brake flaps, ailerons, flap track fairings, slats, engine mounts, winglets, wings, tail units, rudders, doors, covers, claddings, supports, etc., for example, is posed by the undercut structures required in many cases to create the necessary stiffening within the sealed outer skin.

SUMMARY OF THE INVENTION

The object of the invention is to describe a simple method for producing a complex, integral fibre composite component with a plurality of undercut stiffening members which is also flexible with respect to varying construction conditions for the fibre composite component and which can be incorporated in an extensively automated and industrialised production process. In addition, another object of the invention is to provide a core mould, which is flexible with regard to changing construction requirements, for producing the cores required in the method.

This object is achieved in the first instance by a method with the following steps:

a) Production of a plurality of removable cores in a core mould, the cores substantially representing an inner surface geometry of the fibre composite component with integral spars and ribs forming the outer skin, b) Application of preforms made from reinforcing fibres to the cores to form stiffening members and arrangement of the cores to form an overall structure, c) Coating the cores with a web-like semi-finished product to create the outer skin, d) Incorporation of the overall structure into a closed moulding tool and infiltration of the overall structure with a curable plastics material, e) Curing to create the finished fibre composite component by applying pressure and/or temperature, and f) Removal of the cores.

In a first step a) of the method, all the cores required for performing the method are produced. A separate, closed core mould, which has at least one top and one bottom mould part, is used to cast the cores. A plurality of at least partially intersecting dividers for creating cells are located in the core mould. To allow the dividers to be positioned such as to create intersecting areas, the dividers each have longitudinal slits across their length which extend approximately to the middle of the divider plate. The dividers can thus be inserted into each other from either side. In the intersecting area the longitudinal slits are fitted into the opposite intersecting plates. Each cell formed in this manner in the core mould represents a closed casting chamber for the core to be produced and can be filled with the core material by means of at least one hole in the lower and/or upper mould part. Vent holes may also be provided in some cases in order to promote rapid and, more importantly, bubble-free casting of the cores.

Both parts of the core mould define an image of an "inner" surface geometry of the fibre composite component to be produced, which may, for example, be a landing flap. When producing a landing flap, the dividers between the cells may, for example, be in the form of spar plates and rib plates. The spar plates and rib plates represent placeholders for the stiffening members, undercut in some cases, which will later be found in the fibre composite component in the form of (longitudinal) spars and (transverse) ribs.

In order to produce the cores, the spar plates and the rib plates are preferably inserted in the lower mould part which is equipped with grooves for this purpose and the whole structure is closed by applying the top mould parts. The core material is then inserted in the closed core mould through the holes in the mould parts and cured.

A material with a low melting point, for example a wax, a metal alloy or similar, may be used as the core material. Alternatively, a substance which solidifies initially can also be used for the core material, which substance being subsequently completely dissolved by an appropriate solvent, for example water, diluent, or similar, before being rinsed back out of the core mould in the final step of the process. Irrespective of the core material used, the core material should have an adequate compressive strength of at least 8 bar for the subsequent infiltration process ("RTM process"). The moulds are removed by means of holes made in the outer skin retrospectively, the solvent used to dissolve the cores being applied through these holes, allowing the core material to flow out through the holes. Industrial epoxy resin systems for aircraft construction currently usually still have such high curing temperatures ($\approx 180°$ C.) that the use of meltable cores is not indicated. The matrix-like overall structure with all cores (so-called "core" composite forms) represents the desired inner surface geometry of the fibre composite component which will subsequently be produced. Structural changes to the fibre composite component, for example changes to the material thickness of the spars and/or ribs, may be implemented quickly and easily by exchanging the relevant dividers, without the need for complex changes to the (RTM) moulding tool used for the final infiltration process. To this end, the core mould is preferably made from a material which can be processed quite easily, such as an aluminium alloy, for example.

In a second step, b), preforms made from reinforcing fibres (so-called dry preforms with binders) are applied on all sides of the cores, especially to form the fibre reinforcements for the spars, ribs and outer skin. A plurality of preforms can be placed on top of one another if necessary. The cores are then positioned relative to one another so as to create the desired shape of the fibre composite component. When producing a landing flap, the cores are first positioned in the direction of the landing flap's longitudinal extension and the cores are then attached in series in the transverse direction thereof. As the preforms already have a bonding agent, these have a certain degree of form stability.

In the third step, c), the cores which are positioned and oriented relative to one another are provided with a web-like semi-finished product formed from reinforcing fibres to create the outer skin, which is preferably sealed upon itself. The semi-finished product is preferably a fabric which is highly drapable/resilient and which ideally fits the usually two-dimensional curved surface geometry prescribed by the cores without any folds. Both the fibre preforms and the web-like semi-finished product are preferably made from carbon fibres. As a general rule, all fibres which are suitable for use as reinforcing fibres, such as glass fibres, ceramic fibres, natural fibres (hemp), etc., may be used.

The preforms and the web-like semi-finished product may be fixed in position by means of subsequent "binders" using a thermoplastic synthetic material, for example, for example by spraying in powder form. Alternatively, an appropriate thermoplastic bonding agent may already be incorporated in the preforms or the strip-like semi-finished product, so that merely applying heat is sufficient to fix the preforms or the semi-finished product onto the cores. In order to fill any unwanted cavities, especially between the cores lined with preforms, it is generally necessary to insert additional gussets and/or individual reinforcing fibre strands (rovings) or a plurality of layers of a reinforcing fabric between the cores.

In the fourth step, d), the overall structure thus created is inserted into an at least two-part, preferably metallic moulding tool, the internal surface geometry of which is defined by the halves of the mould and accurately embodies the desired surface geometry of the fibre composite component to be produced. After closing the at least two halves of the mould, the overall structure is soaked or impregnated with a curable plastics material, which may be under superatmospheric pressure in some cases, in particular a curable epoxy resin, in the known resin infiltration method (RTM process E Resin Transfer Moulding process). The metallic moulding tool is an RTM moulding tool manufactured with high precision from high-tensile and temperature-resistant steel. By simultaneously applying a low pressure to the RTM moulding tool, the infiltration process or the injection process is speeded up and the risk of air inclusions and cavities forming is addressed. The RTM moulding tool is heated directly and/or indirectly. In the case of indirect heating, the whole RTM moulding tool is placed in an oven, whilst in the case of direct heating, heating means are incorporated directly in the moulding tool. These heating means may comprise of electric heating members or holes through which a liquid which can be temperature-controlled, in particular oil, is passed.

In the fifth step, e), the finished fibre composite component is cured by the use of pressure and/or temperature and in the sixth and final step, f), the cores are finally removed from the fibre composite component by heating and/or applying a solvent. In order to do this, it is generally necessary to insert small holes in the sealed outer skin to allow the dissolved or liquefied core material to flow out. Alternatively, apertures positioned in the corner regions of the transverse ribs can be used for this purpose, these apertures serving to drain off condensation water in the finished component.

The method according to the invention thus allows integral fibre composite components with a complex internal undercut stiffening structure to be produced in a simple manner by using a two-dimensional matrix arrangement of soluble (meltable) or subsequently removable cores.

An advantageous improvement on the method provides that the cores are provided with an impermeable coating after casting and curing. This avoids plastics material being pressed into the cores in an uncontrolled manner during the final infiltration process, resulting in the fibre composite component having an undefined inner surface ("casting trees") after curing and removal of the cores. This coating may also have non-stick properties to enable this coating to be removed/detached from the finished component.

It is also provided that the stiffening members will in particular be designed as integral ribs and spars within the outer skin. However, in general terms, the method is not restricted to a traditional spar-rib structure with an outer skin, as is traditionally used for example in wings, horizontal stabilisers, rudder units and landing flaps of aircraft. By positioning and configuring the dividers accordingly in the core mould, it is more the case that hollow structures which have internal stiffening in almost any form and a sealed outer skin can be produced as fibre composite components. Furthermore, it is not necessary for the dividers, which are designed as spar plates and rib plates in the case of a landing flap, to intersect at an angle of 90° in the intersecting region. In principle, any angle is possible, as is a shape other than a straight line, for example the dividers may follow a curved course within the core mould. Furthermore, deviating from the cross-sectional wing geometry shown by way of example, the dividers may have any height contour in order to produce fibre composite components with a dual curved surface which is variable within wide boundaries and with a surface geometry which is also integrally sealed.

The method is particularly intended for the automated, industrial production of fibre composite components in large quantities for the passenger aviation industry, in which structural fibre composite components produced in the conventional single-piece method with spar-rib structures are currently predominantly used.

According to a further development of the method according to the invention, it is provided that a stringer preform will be fitted in at least one longitudinal recess, in particular a groove, in at least one core before applying the web-like semi-finished product, resulting in support by at least one support member which is subsequently inserted.

This makes it possible to create longitudinal stiffening members, for example in the form of hat stringers or Ω stringers, as an integral part of the outer skin surrounding the fibre composite component in addition to the stiffening members in the form of spars and ribs, for example. Inflatable plastics material hoses (tubular films) are preferably used as support members and these can remain in the finished composite component or be pulled out from the side if necessary. Alternatively, dissolvable or meltable cores can be used as support members and these can also be used for the residual cores with undercuts.

The object according to the invention is also achieved by a core mould.

The fact that the core mould has a plurality of cells which are enclosed between an upper and a lower mould part to define the inner surface geometry of an outer skin, with the cells being formed from a plurality of dividers spaced apart from each other, in particular, rib plates and spar plates, which intersect, at least in part, and each cell having at least one hole for supplying the core material, makes it possible to produce all the cores required for performing the method at the same time. Further the dividers have a plurality of holes for passing through positioning means.

In addition, the dividers and the at least two halves of the core mould are preferably made from a metal alloy which is easy to process, for example an aluminium alloy. Structural changes to the fibre composite component can thus be implemented by removing the divider material in certain regions and/or exchanging the dividers. If, for example, the material thickness of a stiffening member is to be changed in the finished fibre composite component due to static considerations, it is sufficient to replace the relevant divider with another divider with the required material thickness.

Other advantageous embodiments of the method and the core mould are described in the remaining claims.

BRIEF DESCRIPTION OF THE DRAWINGS

The drawings are as follows:
FIG. 1 an isometric view of a core mould for producing the cores,
FIG. 2 a cross-sectional view through three aligned cores with preforms and semi-finished product,
FIG. 3 a cross-section through the overall structure of the complete reinforcing fibre arrangement for a landing flap,
FIG. 4 a detail from FIG. 3 in a connecting area between a front spar preform and the web-like semi-finished product with the moulding tool used for the RTM process,
FIG. 5 another detail from FIG. 3 in the region of a stringer preform,
FIG. 6 a cross-sectional view along line VI-VI in FIG. 3 in the region of a load application point designed as an integral part of a (transverse) rib,
FIG. 7 a variation of the core mould with positioning means for the cores,
FIG. 8 an enlarged detail from FIG. 7,
FIG. 9 a schematic view of the application of the web-like semi-finished product to form the outer skin,
FIG. 10 a view of a blank and a corner preform formed from this blank,
FIG. 11 a view of a blank and a rib preform formed from this blank, and
FIG. 12 an isometric view of a landing flap as an example of an integral fibre composite component produced according to the invention with internal, undercut stiffening members.

DESCRIPTION OF EXEMPLARY EMBODIMENTS

In the drawings, the same structural members have the same reference numerals in each case. The method and the devices used to perform the method, in particular the core mould for producing all cores, are described in parallel in the rest of the description.

Figure 1:
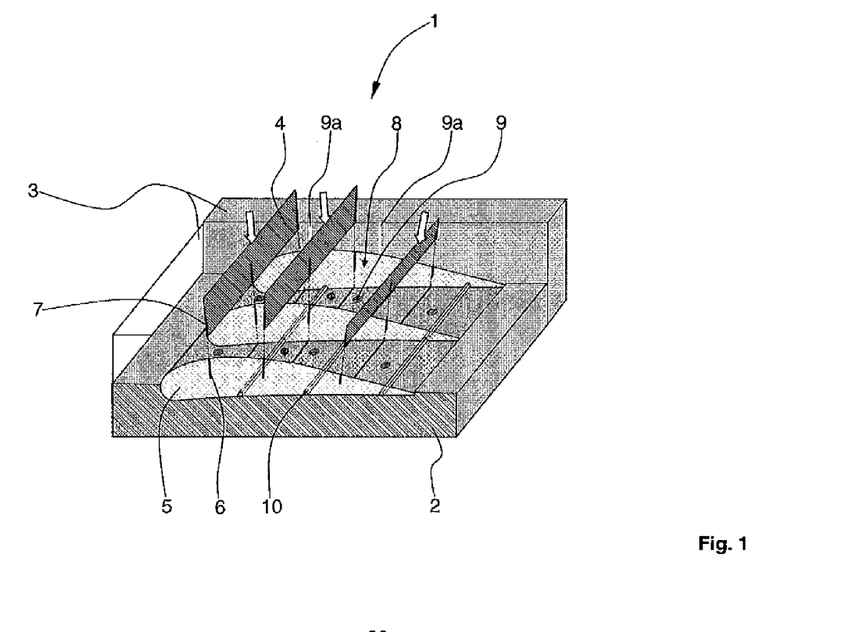

FIG. 1 shows an isometric drawing of the mould used to produce the cores for performing the method, using the example of a landing flap for an aircraft.

A core mould 1 comprises a lower and an upper mould part 2, 3. A plurality of dividers, which are not denoted individually, are arranged within the moulding tool and in this particular example are designed as spar plates with rib plates running in the transverse direction thereto for production of a landing flap. Of the spar and rib plates, only one front spar plate 4 and one front rib plate 5 have reference numerals. A cross-sectional geometry of the rib plate 5 follows the cross-sectional geometry of the landing flap in this region. The spar plates 4 are inserted in slits which do not have reference numerals in the lower and/or upper mould part 2, 3 and are hereby guided. In the illustrated embodiment, the rib plate 5 has a total of three slits, of which only the front slit has a reference numeral 6, the slits each extending from an upper edge of the rib plate 5 to approximately the middle of the rib plate. The spar plate 4 also has three slits or longitudinal recesses, of which only the front slit 7 has a reference numeral. Unlike the slits 6 in the rib plates 5, the slits 7 in the spar plates 4 each extend from the bottom to approximately the middle of the relevant spar plate 4. Due to the described slit configuration, the spar plates 4 can be inserted into the rib plates 5, forming intersecting areas which are not illustrated and a plurality of cells in the direction of the arrows (on alternate sides). One cell with reference numeral 8 is representative of the other, similarly constructed cells. The total of eight cells in FIG. 1 represent the actual casting moulds used to produce the cores. The underside of mould part 2 has a small hole 9 in the region of cell 8, as in the other cells, through which a suitable liquid core material can be supplied. Alternatively the holes can also be provided in the upper mould part 3. Additional vent holes 9a may also be provided. Before pouring in the core material to produce all eight cores simultaneously, the dividers are inserted/assembled and the two mould parts 2, 3 are closed to create the core mould 1.

The core material for the undercut, dissolvable cores is a meltable material with a melting point above the curing temperature of the matrix material or a curable substance which can subsequently be redissolved by means of an appropriate solvent, such as water, chemical solvent or similar, for example, and rinsed out of the subsequent component. The dissolution process may take place by physical or chemical means. When using epoxy resins, the use of soluble cores is generally preferred due to the high curing temperatures of up to 200° C. as the temperatures required to melt the cores may damage the epoxy resin matrix. However, when melting dissolvable cores thermosetting plastics materials can be used advantageously as these are cured at lower temperatures. Holes made retrospectively in the outer skin and/or apertures made in the corner regions of the transverse ribs are used to remove the cores, and these later serve as drainage apertures for condensation water. Depending on the core material used, it may be necessary to also provide the cores with a release film or coating, i.e. to impregnate them to prevent penetration of the plastics material used in the resin infiltration process for producing the finished fibre composite component, in particular an epoxy resin system.

The lower mould part 2 also has three longitudinal webs each with a slightly trapezoidal cross-sectional geometry, the middle web of which has reference numeral 10. The webs 10 running parallel to the spar plates 4 lead to the formation of longitudinal recesses on the underside of the cores, in particular trapezoidal grooves, which are subsequently used to produce longitudinal stiffening members, especially in the shape of hat stringers.

The core mould 1, including the dividers, is preferably made from a material which can be processed easily, such as an aluminium alloy or similar, for example. This means that structural changes to the subsequent fibre composite component, for example in the form of an increased or reduced material thickness of the spars, can be implemented quickly by exchanging the relevant spar plate or by removing material from the relevant spar plate. In particular, changes to the very complex and difficult-to-process mould for the subsequent resin infiltration process (RTM process), in which high-tensile steel moulds are used, are no longer necessary, as only the outer moulding tool is made from high-tensile steel (high-temperature chrome-nickel alloy) and its geometry is fixed at an early stage. The first step a) is completed by the simultaneous production of all the required cores in the described device.

Figure 2:
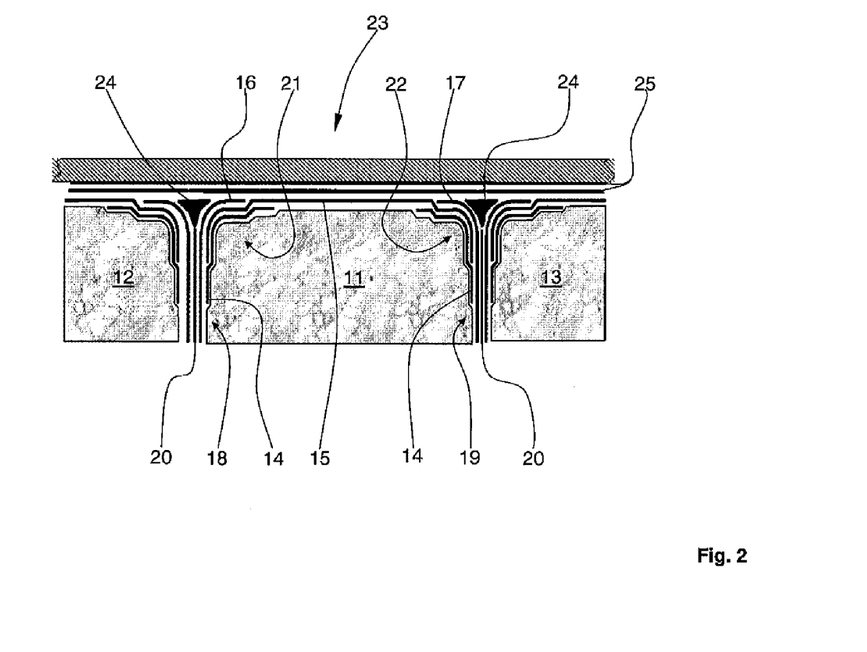

FIG. 2 is a highly schematic view of a cross-section through an upper portion of a core with a plurality of preforms and two layers of a web-like semi-finished product which represent a detail from the overall structure of a reinforced fibre arrangement for the subsequent fibre composite component.

During the second step, b), a plurality of different preforms are placed on the cores. The cores are then grouped together to form an overall structure, which substantially reflects an inner surface geometry of the fibre composite component to be produced (see FIG. 1). The cores 12, 13 adjoin a middle core 11 on both sides. The laminar structure will be explained using this middle core 11 as an example. A prefabricated corner preform 14 is first placed onto the core 11.

A preform, such as the corner preform 14, for example, is a flat blank with any external contour made from a multiaxial fibre-woven fabric (so-called "NCF"=non-crimped fibres) or textile, especially a web-like semi-finished product made from carbon fibres, which, if applicable, is folded at least once and/or draped in certain regions to create a three-dimensional structure. As a general rule, a preform can be made in any geometrically possible shape by folding, draping and cutting. Finally, each preform is produced with the reinforcing fibres running in an appropriate orientation, in particular an orientation that takes force flux and loads into account. For example, the preforms are produced with a textile and/or fabric ("multiaxial fabric") made from reinforcing fibres at ±45° and in a 0°/90° position.

Then there is a skin preform 15. Spar or rib preforms 16, 17 are then applied in the required numbers to opposite side surfaces 18, 19 of the core 11 to produce the respective stiffening members. Optional intermediate preforms 20 can also be provided between the cores if necessary. The crucial aspect is that the corner preforms 14 and the skin preforms 15 are positioned such that they overlap in the region of the edges 21, 22. The same applies to the arrangement of the spar preforms and rib preforms 16, 17 on the underlying skin preforms 15. The fact that these preforms are dovetailed or overlapped with each other means that the preforms are held together by mechanical means within the subsequent fibre composite component.

So as to avoid undesirable thickening in the subsequent composite component, the surrounding edges 21, 22 of all cores have a plurality of flat, mutually graduated depressions (not denoted), the exact depth of which corresponds to the respective material thickness of the preforms applied on top of one another. This leads to the fibre content by volume having a narrow tolerance of, say, 60% in an interval of ±4% in the finished component. Depending on the number of overlapping layers, a corresponding number of graduated, offset steps is provided. The preforms have a tab (flange) on at least one side, at least in portions, and this tab is turned along one of the edges 21, 22 of the core 11, i.e. it is placed on one of the side surfaces 18, 19 of the core 11. In this case the tabs lie in the depressions in the core 11, so as to provide a smooth finish on top. The depressions may be designed to be graduated in a plurality of stages to cover the eventuality that a plurality of tabs need to be laid on top of one another (see FIG. 4 in particular). Alternatively the tabs can be designed to be slit, so that they are able to follow curved edges of the cores. The preforms preferably have consistently designed tabs on all sides. The cores 11 to 13 are then arranged with respect to each other in the form of a matrix such that they correspond to the internal contour of the subsequent fibre composite component, i.e. the cores 11 to 13 which are provided with preforms are once again arranged to form an overall structure 23 such as was originally removed from the core mould after the casting process (see FIG. 1). Only the upper regions of the cores 11 to 13 are shown in the drawing in FIG. 2, but the same procedure as described above is used to arrange the preforms in the lower regions of the core 11 to 13.

The preforms are preferably produced with a ply, textile or with a plurality of discrete carbon fibres or carbon fibre rovings. Gussets 24 are also inserted in the areas between the cores 12 to 13 in order to complete the overall structure 23 forming the subsequent reinforcing fibre arrangement of the composite component.

Finally, in a third step, c), the overall structure 23 of the cores is coated with at least one layer of a web-like semi-finished product 25 to produce the subsequent reinforcement for the outer skin of the fibre composite component.

The web-like semi-finished product 25 is preferably a highly drapable textile or ply made from carbon fibres which is able to follow the generally dual curved surface geometry of the cores 11 to 13 without any folds. The sequence described above for applying the preforms or the web-like semi-finished product 25 is applied to all cores. In addition, it may be necessary to insert individual carbon fibre gussets 24 made from carbon fibre rovings into the overall structure 23 in order to fill any cavities if necessary. The semi-finished product 25 fits above on an upper part of an RTM moulding tool which is shown with hatched lines, but without a reference numeral.

In order to fix the position of the preforms and the web-like semi-finished product 25 on the cores 11 to 13, it may also be advantageous to apply a thermoplastic bonding agent, for example. Alternatively, preforms or web-like semi-finished products can be used which are already equipped by the manufacturer with a thermoplastic bonding agent ("pre-bonded"), so that the product merely needs to be heated to fix it in position.

Figure 3:
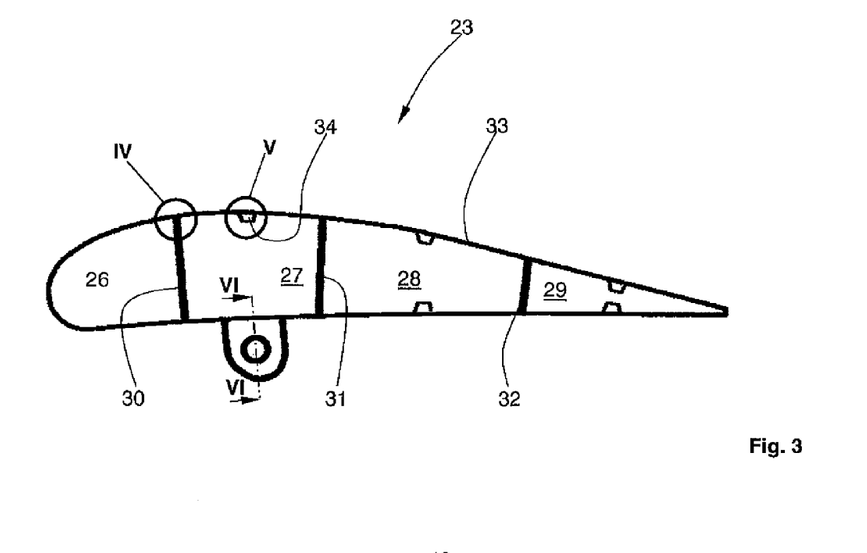
Figure 4:
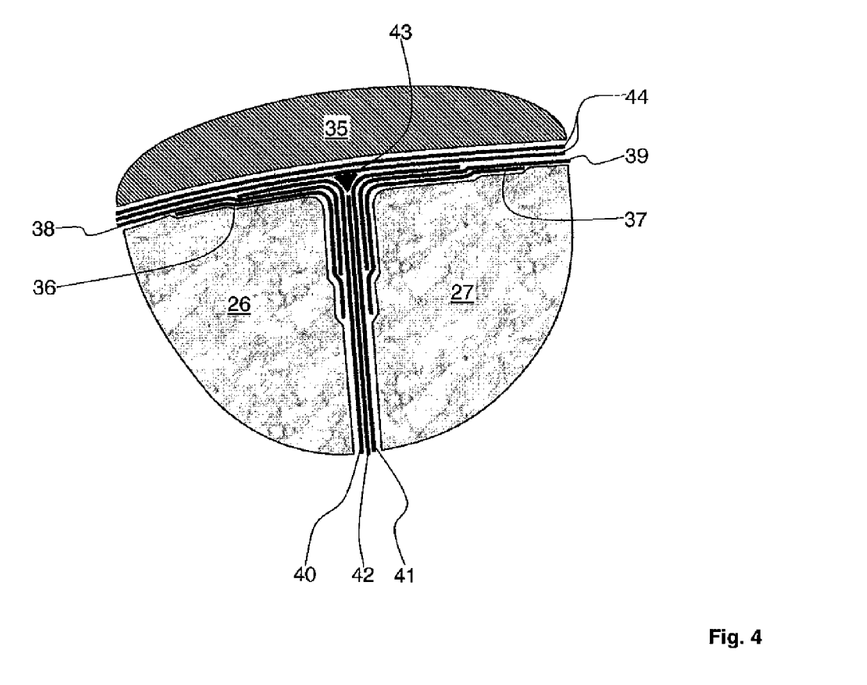

FIG. 3 shows a schematic cross-section through the overall structure of the dry reinforcing fibre arrangement, whilst FIG. 4 represents an enlarged detail of the area between the spar preforms and the web-like semi-finished product forming the outer skin. In the following reference is made to FIGS. 3 and 4 at the same time.

Amongst other things the dry (reinforcing fibre) overall structure 23 includes four cores 26 to 29, which are divided by three spar preforms 30 to 32 and surrounded by a web-like semi-finished product 33 to form the subsequent outer skin. In addition, six correspondingly preformed stringer preforms, only one of which stringer preforms 34 has a reference numeral, are provided in the cores 27 to 29 and these are used to create the integral longitudinal stiffening profiles, especially the stringers, Ω stringers or hat stringers, in the subsequent fibre composite component.

This overall structure 23 is inserted into a closed moulding tool 35 in step d) for the infiltration process or RTM process. The moulding tool 35 is made from a high-tensile and heat-resistant steel alloy. The external surface geometry of the composite component is only defined by the moulding tool 35. Following complete infiltration of the overall structure 23 by a curable plastics material, in particular an epoxy resin system or similar, the structure is cured completely in step e) to give the finished fibre composite component. The RTM tool can be heated as required by direct or indirect heating. The cores 26 to 29 are removed or dissolved in the final process step f) by melting or flushing out. Holes in each cell defined by two ribs and spars are used for this purpose, which holes are subsequently made in the outer skin and may be used later for drainage purposes, in order to carry out material tests and for maintenance and inspection tasks.

A reliable test of the finished integral composite component for air inclusions, delaminations, foreign bodies, fluctuations in thickness, etc. can be carried out if necessary.

FIG. 4 shows a detailed laminar structure in the region where the front spar 26 connects to the outer skin 33 within the overall structure 23 of the reinforcing fibre arrangement. Both cores 26, 27 are again lined with corner preforms 36, 37. The skin preforms 38, 39 lie in an overlapping manner on the corner preforms 36, 37. Then there are two spar preforms 40, 41 separated by an intermediate preform 42. There is also a (reinforcing fibre) gusset 43 with an approximately triangular cross-sectional geometry running between the cores 26, 27 in order to achieve a sufficiently flat surface. Again, two layers of a web-like semi-finished product 44 then form the upper finish of the overall structure 23. A very close join is achieved, resulting in a very strong fibre composite component, due to the overlapping layering in the edge regions of the preforms.

Figure 5:
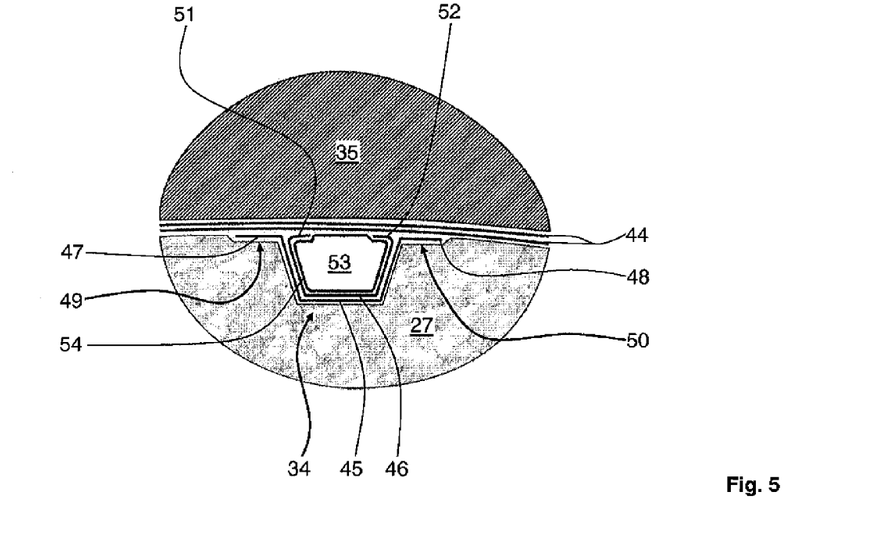

FIG. 5 shows another detail from FIG. 3 and illustrates the arrangement of stringer preforms to form the longitudinal stiffening, especially in the form of an Ω stringer or a hat stringer, in a detailed view.

In the embodiment shown in FIG. 5, the hat stringer 34 is formed from two stringer preforms 45, 46 which nest inside one another and each have a trapezoidal cross-sectional geometry. The outer stringer preform 45 has a tab 47, 48 on each side, which tabs are located in the graduated depressions 49, 50 on the core 27 to ensure a flat upper finish. The tabs 47, 48 are directed away from each other and point outwards. The inner stringer preform 46 has two tabs 51, 52 which point towards each other. The two stringer preforms 45, 46 are inserted in a longitudinal depression 53 in the core 27, which in the illustrated embodiment is in the form of a groove with a trapezoidal cross-sectional geometry. In order to support the stringer preforms 45, 46 during the final infiltration process, there is a hollow support member 54, which may, for example, be formed from a partially resilient, inflatable tubular film and which is removed from the longitudinal stiffening profile 34 again after the infiltration and curing process. The structure is sealed off at the top by two layers of the web-like semi-finished product 44 (textile). The support member may alternatively be formed from the same removable (meltable or soluble) material as cores 11 to 13.

Figure 6:
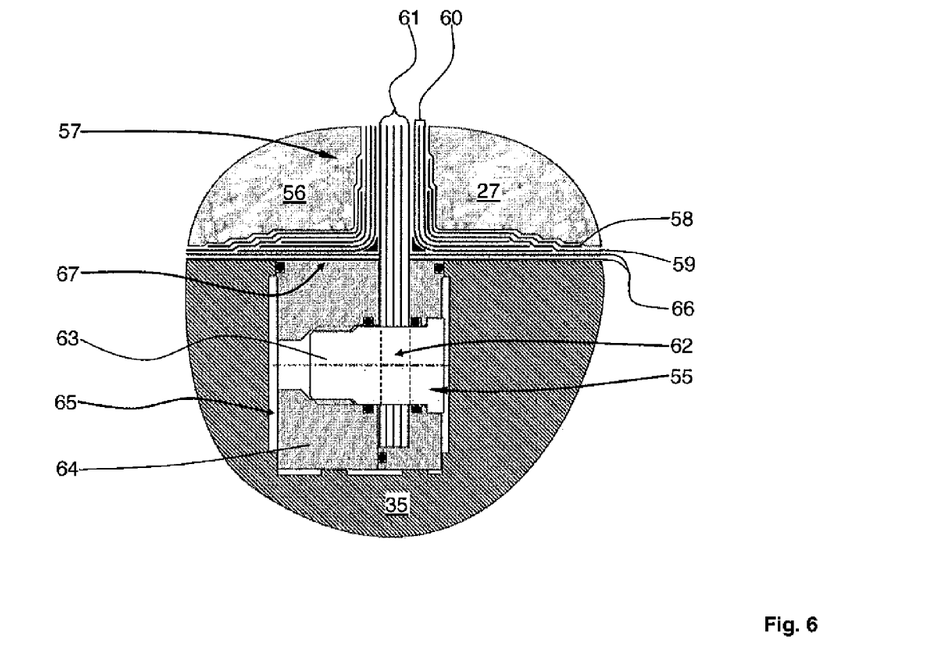

FIG. 6 is a cross-sectional view along line VI-VI in FIG. 3 which illustrates the inclusion of a load application point in the subsequent composite component in accordance with the method.

A load application point 55 in the region between the core 27 and a neighbouring core 56, which in the view in FIG. 3 is positioned behind the core 27 in relation to the plane of projection, is designed as an integral part of a (transverse) rib 57 formed with at least one dry preform.

The core 27 contains a corner preform 58, a skin preform 59 and three rib preforms 60. The arrangement of preforms on the second core 56 is a mirror image of the arrangement of preforms on the core 27. Unlike the "normal" construction of spars/ribs with dry preforms, a total of five additional load application preforms 61 are provided when creating the load application point 55, these being positioned between the rib preforms 60, thus ensuring optimum force transmission over a large surface area of the overall structure of the fibre composite component. The load application preforms 61 have a recess 62 at their lower ends, which are not illustrated, this recess being intended to take a cylindrical core 63 or bolt to form a connection eye in the subsequent composite component.

Alternatively, the lower ends of the load admission preforms 61 can also simply be placed around the core 63. The core 63 may be formed from the same removable or soluble core materials as the other cores 11 to 13. The core 63 is also held in a two-part mould 64 which is in turn located in a correspondingly shaped cavity 65 in the moulding tool 35. Dividing the mould 64 in two guarantees removal from the mould. In order to pass the load application preforms 61 through the subsequent outer skin, a recess 67 or penetration with edge reinforcement, in particular a slit, is introduced in both layers of the web-like semi-finished product 66. Alternatively, the eye can also be created by drilling the load admission preforms 61 retrospectively on completion of infiltration and curing. In this case the cylindrical core 63, the two-part mould 64 and the cavity 65 in the moulding tool 35 are no longer necessary.

Figure 7:
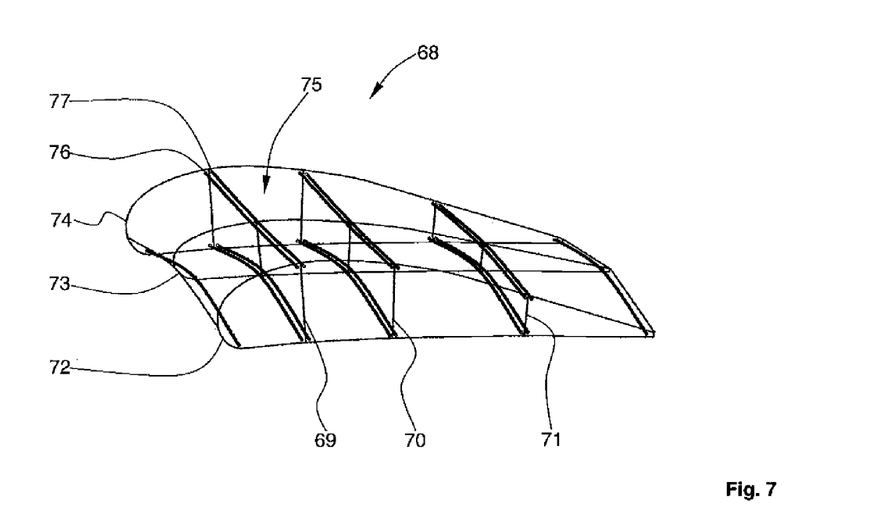

FIG. 7 is a schematic illustration of an alternative embodiment of the core mould shown in FIG. 1, in particular to facilitate precise orientation of the cores after production.

A core mould 68 comprises amongst other things three spar plates 69 to 71 and three rib plates 72 to 74 as space holders (dividers) for the spars and ribs in the subsequent fibre composite component. In the cells individually defined by the spar plates 69 to 71 and the rib plates 72 to 74, a total of eight cores are produced by filling with the curable core material as described above, one of these cores 75 having a reference numeral. The additional components in the core mould 68 are not shown for purposes of clarity (in particular see FIG. 1).

Unlike the embodiment of core mould 1 in accordance with FIG. 1, a plurality of positioning aids are provided in the core mould 68, two of these positioning means being shown with reference numerals 76, 77 and representing all the others. The positioning means 76, 77 are simply included in the casting process and removed from the cores after hardening/curing. The positioning means 76, 77 are preferably formed from Teflon-coated wires or tubes to make it easier to remove them from the cores.

The positioning means 76, 77 are passed through holes (not illustrated) in the rib plates 72, 73 and approximately follow the respective upper and lower contours of the edges of the spar plates 69 to 71 whilst maintaining a small distance of a plurality of millimeters therefrom. However, due to the curve of the edges of the spar plates 69 to 71 and the straight lines of the positioning means 76, 77, this distance may vary. The positioning means 76, 77 may be mechanically tensioned with tensioning means (not illustrated) in order to ensure a defined course.

The purpose of the positioning means 76, 77 is as follows: once the cast cores have been cured in process step a), the positioning means 76, 77 are removed from the cores. All cores are then lined with the preforms as explained in the description of FIGS. 2 to 6 (method step b). The cores are then positioned next to each other to form a row (which is initially parallel to the spar preforms) and then arranged precisely with respect to each other by re-inserting the positioning means and held together. Additional cores in the rib direction are then grouped together to form a complete row, followed by subsequent rows, until the overall structure is complete. Once all the rows are arranged and aligned, all the cores are evenly coated with the web-like semi-finished product in step c) to reinforce the outer skin, thus creating the overall structure of the complete reinforcing fibre arrangement required to produce the integral fibre composite component. The material thickness of the spar preforms, the rib preforms and the number of layers of the wound web-like semi-finished product should in particular be calculated such that the overall structure can be fitted in step d) as accurately as possible, without distortion, in the at least two-part moulding tool for the RTM process. If applicable, optional layers of reinforcing fibres must be added to the overall structure for tolerance compensation. The positioning means also prevent the cores from moving inside the RTM tool and ensure a high and reproducible level of dimensional accuracy of the fibre composite component. The last two steps e) and f) merely entail curing the fibre composite component after the RTM process and subsequently removing the cores from the hollow composite component.

Figure 8:
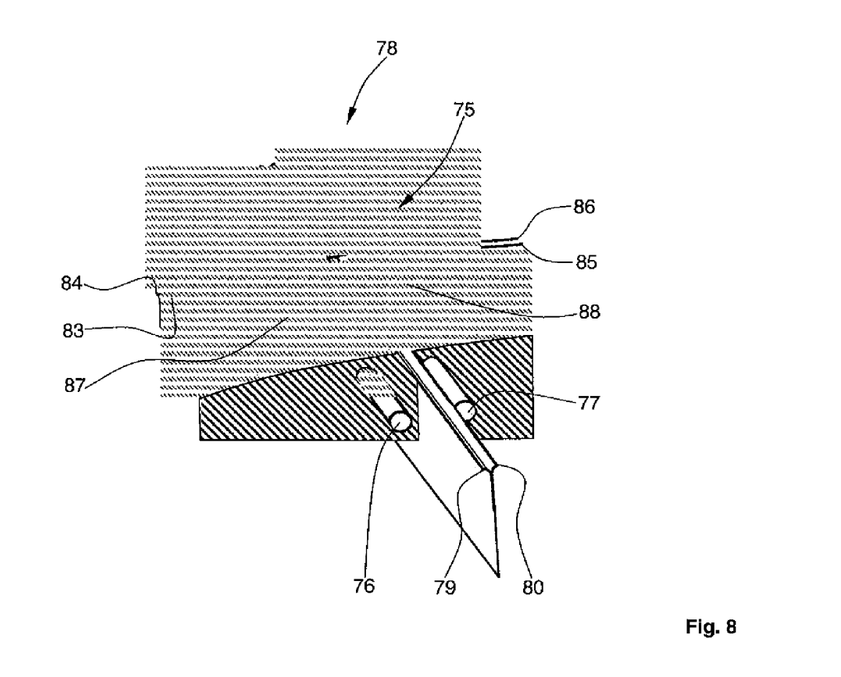

FIG. 8 shows an intersecting area 78 between the core 75 and three further adjacent but not denoted cores. The spatial extent of the cores between the preforms is shown by a dotted pattern. Two continuous spar preforms 79, 80 and four rib preforms 83 to 86 are located in the intersecting area 78. Planar vertical blades may be inserted between the continuous spar preforms 79, 80 in some cases in order to increase the material thickness of the spars. The single-piece spar preforms 79 and 80 which extend over the total length of the component are of crucial importance for the potential strength of the subsequent integral fibre composite component. In comparison, the rib preforms 83 to 86 are sub-divided, i.e. they only extend between two adjacent spars. Upper tabs (not illustrated) on the preforms 79 to 86 are in each case folded over in the direction of the edges of the cores which are likewise not denoted. Quadrant-shaped plates 87, 88 are fitted on the positioning means 76, 77 in the region of the intersecting region 78 and these are used to create the quadrant-shaped drainage apertures in the subsequent composite component. The plates 87, 88 are preferably manufactured from the same removable material as the cores. In accordance with the embodiment in FIG. 8, such plates are provided in all other intersecting regions in order to create drainage apertures. The four rib preforms 83 to 86 have cut-outs for this purpose, the shape of which approximately corresponds to the geometric form of the plates 87, 88. As a result of the quadrant-shaped drainage apertures, it is possible to dispense with the drilling of holes in the outer skin of the subsequent fibre composite component to create drainage means, this being advantageous from both a static and an aerodynamic viewpoint and also simplifying the production process. However, any condensation water contained inside the structure is only able to flow along the spars as there are no drainage apertures in the spars.

As an alternative to the plates 87, 88 located in the corner regions of the cells, the rib plates 72 to 74 (see FIG. 7) can be provided with correspondingly positioned recesses or depressions which may, for example, be quadrant-shaped, which are filled with the core material during the core casting process and also form corresponding drainage apertures in the subsequent composite component in order inter alia to guarantee drainage of condensation water from the landing flap along the (longitudinal) spars.

Figure 9:
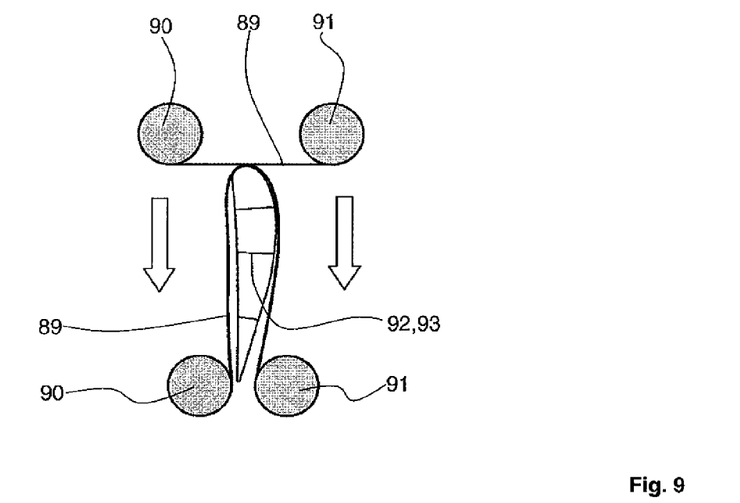

FIG. 9 is a schematic illustration of the procedure in step c) in which the web-like semi-finished product is placed on the positioned cores provided with preforms.

A web-like semi-finished product 89, in particular a drapable carbon fibre fabric, is supplied to the device used in this instance on two reels 90, 91. Due to the downward movement of the two reels 90, 91 in the direction of the arrows pointing downwards, the web-like semi-finished product 89 is pulled evenly off the reels 90, 91 and placed onto a prepared structure 92 and cut to size. Each reel 90, 91 preferably approaches the prepared structure 92 during the downward movement and is repositioned in the vertical direction in order to support a fold-free application process.

If necessary, the process can be repeated at least once in order to achieve an increased material thickness of the web-like semi-finished product 89 on the prepared structure 92 and thus the subsequent outer skin. Additional pressure rollers which are not illustrated may be provided to press the semi-finished product 89 firmly and, most importantly, in a fold-free fashion, to the structure 92 and, if applicable, to secure it in its end position at the same time by applying heat and/or adding a bonding agent. Once the web-like semi-finished product 89 has been applied to the structure 92, the structure 92 then embodies a finished overall structure 93 of a complete reinforcing fibre arrangement for producing the fibre composite component.

Figure 10:
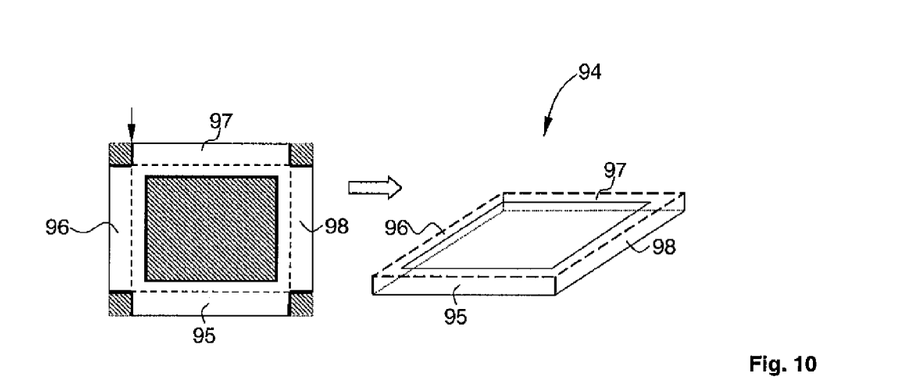
Figure 11:
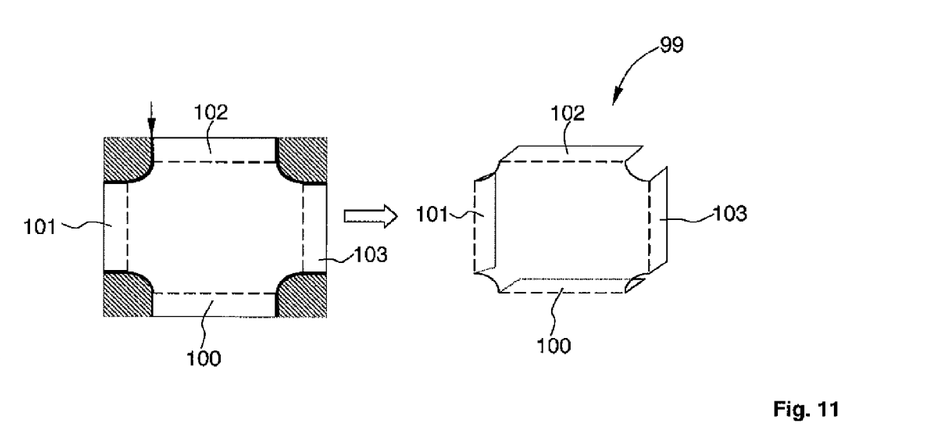

FIGS. 10 and 11 are schematic illustrations showing a possible structure of two prefabricated preforms for lining the cores, i.e. ultimately for creating the internal stiffening structure. Both preforms have been formed by cutting and folding from a planar blank. The blank used may, for example, be created from a multiaxial fibre-woven fabric or a drapable textile made from carbon fibres. The dashed lines in FIGS. 10, 11 represent fold lines, the lines drawn in bold symbolise cutting lines and the dotted lines represent the original outline of the blank or concealed edges in the isometric view. Cut-out areas are hatched for further clarification.

The left part of FIG. 10 shows a schematic example of a blank which is used to produce the corner preform 94 depicted on the right-hand side. The corner preforms 94 are used to reinforce the edges of the cells in the fibre composite component and to form a mechanical connection between the outer skin and the spar or rib preforms by creating overlaps. The corner preform 94 has four tabs 95 to 98 formed by cutting along the bold line (square portions of the blank) and then folding through approximately 90°, these being inserted in the graduated depressions running around the edges of the cores (see FIG. 3 in particular).

The left part of FIG. 11 shows a blank for a rib preform 99 by way of example, from which the rib preform 99 required to create the integral ribs in the subsequent composite component is formed by cutting along the bold lines (substantially square corner portions with internally rounded corners) and by folding the tabs 100 to 103. The peripheral contour is shown as a rectangle for simplification purposes in the schematic illustration in FIG. 11, but in the practical embodiment it follows the internal surface geometry of the outer skin of the fibre composite component.

By using the rib preform 99 shown in FIG. 11 it is possible to create approximately quadrant-shaped drainage apertures in the corner regions of each rib in the composite component, which apertures may be used inter alia to drain the composite component. These cut-out corner regions of the rib preform 99 are kept clear during the core casting process by plates with the same geometry (see FIGS. 7, 8 in particular).

The geometric shape of a spar preform (not illustrated in the drawing) corresponds to the shape of the corner preform 94 shown in FIG. 10—with the exception of the missing recess in the centre and a considerably larger longitudinal extension (in the horizontal direction).

Figure 12:
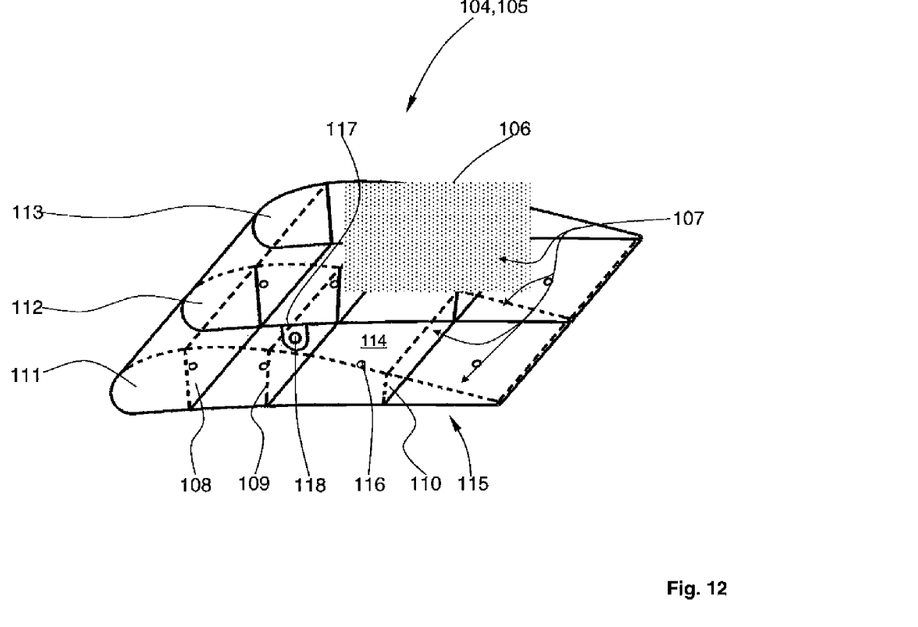

FIG. 12 finally shows the finished integral fibre composite component with a plurality of internal and undercut stiffening members in a view from beneath.

A fibre composite component 104 produced in accordance with this method, which in the illustrated embodiment relates to a landing flap 105, has a plurality of internal, undercut stiffening members 107 formed as an integral part of an outer skin 106. The stiffening members 107 are, by way of example, designed as (longitudinal) spars 108 to 110 and (transverse) ribs 111 to 113 running at an angle of approximately 90° to the spars 108 to 110. The spars 108 to 110 and ribs 111 to 113 which "intersect" in the intersecting regions form an inner stiffening structure with eight substantially closed cells, one of which is provided with a reference numeral 114 to represent all the remaining cells by way of example. Holes are made in the outer skin 106 in the region of an underside 115, each approximately in the middle of the cells, one of these holes being provided with reference numeral 116. The holes are used to drain the cells and also as inspection or maintenance apertures. The holes may be dispensed with in the case of quadrant-shaped recesses in the (transverse) ribs, at least with a view to the drainage of any penetrated water, but may still be of benefit for inspection and maintenance tasks.

The fibre composite component 104 also has a load application point 117 formed as an integral part of the rib 112, in the form of an eye 118, for example, in the underside region 115.

The corner regions of the ribs 111 to 113 each have a plurality of quadrant-shaped apertures, one aperture or recess bearing reference numeral 119 to represent all the others. The apertures are used to rinse out the cores after the end of the RTM process and as drainage apertures in the finished fibre composite component 104 to drain out any condensation water which arises inside the component. Unlike the quadrant-shaped mould, the recesses 119 may have any conceivable geometric shape.

The fibre composite component 104 is preferably produced using a carbon fibre-reinforced epoxy resin. In the case of integral fibre composite components which have lower requirements with regard to structural strength and/or impact strength, other thermosetting plastics materials, such as polyester resins, phenol resins, etc, may alternatively be used. Thermoplastics polymers may also be used in exceptional circumstances if their mechanical properties still seem adequate in comparison with thermosetting plastics materials for the relevant application.

The fibre composite component 104 or landing flap 105 produced using the method according to the invention has excellent strength properties and a low weight due to the fully integral construction method. In addition, the component can be produced in a substantially fully automated process on an industrial scale with a high degree of dimensional accuracy and good repeatability of geometric dimensions and with considerably reduced assembly cost.

Only equipment components to be added at a later stage, such as seals, metal bushes, etc., still need to be fitted manually. Lightning protection fabrics and/or wires which are always required to ensure adequate lightning protection for fibre composite components are created in the outer skin layers before the end of the RTM process by embedding copper wire fabric, copper wires, or a conductive metal perforated sheet or similar.

If the fibre composite component to be manufactured is a rudder unit, a horizontal stabiliser or a complete aircraft wing, for example, the necessary electrical, pneumatic and hydraulic systems must also be assembled in addition.

LIST OF REFERENCE NUMERALS

1 Core mould
2 Lower mould part
3 Upper mould part
4 Spar plate
5 Rib plate
6 Slit (rib plate)
7 Slit (spar plate)
8 Cell (core casting mould)
9 Hole (for supplying core material or ventilation)
9a Drainage hole
10 Web
11 Core
12 Core
13 Core
14 Corner preform
15 Skin preform
16 Spar preform (rib preform)
17 Spar preform (rib preform)

18 Side surface (core)
19 Side surface (core)
20 Intermediate preform
21 Edge
22 Edge
23 Overall structure (reinforcing fibre arrangement composite component)
24 Gusset
25 Web-like semi-finished product (drapable textile, outer skin)
26 Core
27 Core
28 Core
29 Core
30 Spar preform
31 Spar preform
32 Spar preform
33 Web-like semi-finished product (outer skin)
34 Stringer preform (longitudinal stiffening profile)
35 Moulding tool
36 Corner preform
37 Corner preform
38 Skin preform
39 Skin preform
40 Spar preform
41 Spar preform
42/ Intermediate preform
43 Gusset
44 Web-like semi-finished product (outer skin)
45 Stringer preform (outer)
46 Stringer preform (inner)
47 Tab
48 Tab
49 Depression (core)
50 Depression (core)
51 Tab
52 Tab
53 Longitudinal depression (core)
54 Support member
55 Load application point
56 Core (removable)
57 (Transverse) rib
58 Corner preform
59 Skin preform (connection between corner preform <-> outer skin)
60 Rib preform
61 Load application preforms
62 Recess (load application preforms)
63 Cylindrical core (eye)
64 Two-part mould
65 Cavity (moulding tool)
66 Web-like semi-finished product (outer skin)
67 Recess (web-like semi-finished product)
68 Core mould (variation)
69 Spar plate
70 Spar plate
71 Spar plate
72 Rib plate
73 Rib plate
74 Rib plate
75 Core
76 Positioning aid (Teflon-coated wire)
77 Positioning aid (Teflon-coated wire)
78 Intersecting region
79 Spar preform
80 Spar preform
83 Rib preform
84 Rib preform
85 Rib preform
86 Rib preform
87 Plate
88 Plate
89 Web-like semi-finished product (outer skin layers)
90 Reel
91 Reel
92 Structure (cores with preforms)
93 Overall structure (cores with preforms and outer skin layers)
94 Corner preform
95 Tab
96 Tab
97 Tab
98 Tab
99 Rib preform
100 Tab
101 Tab
102 Tab
103 Tab
104 Fibre composite component
105 Landing flap
106 Outer skin (fibre composite component)
107 Stiffening members
108 Spar
109 Spar
110 Spar
111 Rib
112 Rib
113 Rib
114 Cell
115 Underside (fibre composite component)
116 Hole (drainage)
117 Load application point
118 Eye
119 Recess (drainage aperture)

The invention claimed is:

1. A method for producing an integral fibre composite component with a plurality of stiffening members surrounded by an outer skin, comprising the following steps:

producing a plurality of removable cores in a core mould, the cores substantially forming an inner surface geometry of the fibre composite component, the inner surface geometry corresponding to the plurality of stiffening members and the outer skin, wherein the cores are produced in the core mould by filling the core mould with at least one of a soluble or meltable core material which is then cured;

applying preforms made from reinforcing fibres to the cores to form the stiffening members and arranging the cores to form an overall structure;

coating the cores with a fibre product to create the outer skin, a cross section of the overall structure being completely surrounded by the fibre product, wherein the fibre product is a web of reinforcing fibres configured to be infiltrated with a curable plastics material;

incorporating the overall structure into a closed moulding tool and infiltrating the overall structure with the curable plastics material;

curing the overall structure to create the integral fibre composite component by applying at least one of pressure or temperature;

making at least one hole in the outer skin of the integral fibre composite component; and removing of the cores by at least one of heating or applying a solvent, so that the core material is dissolved and flows out through the at least one hole made in the outer skin of the integral fibre composite component.

2. The method according to claim 1, wherein the cores are provided with an impermeable coating.

3. The method according to claim 1, wherein positioning means are cast in the cores and then removed to allow the cores to be aligned with respect to one another.

4. The method according to claim 1, wherein a stringer preform is introduced in at least one longitudinal depression, in at least one core before applying the fibre product, allowing support by at least one support member which is subsequently inserted.

5. The method according to claim 1, wherein at least one load application preform is introduced between two cores in order to provide a connection for an integral load application point, with the at least one load application preform being passed through a recess in the product into the moulding tool.

6. The method according to claim 1, wherein corner preforms are first placed on the cores to reinforce the corners and then skin preforms are applied, followed by rib preforms and spar preforms, after which gussets are inserted between adjacent cores and finally the cores are wrapped with the fibre product.

7. The method according to claim 6, wherein at least the rib preforms have recesses to form apertures for drainage purposes.

8. The method according to claim 1, wherein non-stick coated wires are passed through the finished cores after applying the performs, in order to ensure precise alignment.

9. The method according to claim 1, wherein the preforms are fixed in position using at least one of a bonding agent or that the preforms are already provided with the bonding agent by the manufacturer.

10. The method according to claim 1, wherein the preforms are made from reinforcing fibres.

11. The method according to claim 1, wherein the integral fibre composite component is an aerodynamic surface.

12. The method according to claim 10, wherein the reinforcing fibres used to make the preforms and the fibre product are comprised of carbon fibres.

13. The method according to claim 2, wherein the impermeable coating impregnates the cores to prevent penetration of plastic material used in a resin infiltration process for producing the finished fibre composite component.

14. The method according to claim 1, wherein the web of reinforcing fibres is at least one of a fabric, a textile, or a ply.

15. The method according to claim 14, wherein the web of reinforcing fibres comprises at least one of a plurality of discrete fibres or fibre rovings.

16. The method according to claim 14, wherein the fabric is at least one of a multiaxial fibre-woven fabric or a fabric made of non-crimped fibres.

* * * * *